United States Patent
Tonouchi et al.

(10) Patent No.: US 9,609,588 B2
(45) Date of Patent: Mar. 28, 2017

(54) INFORMATION PROCESSING APPARATUS AND DISPLAY CONTROL METHOD

(71) Applicant: Kabushiki Kaisha Toshiba, Tokyo (JP)

(72) Inventors: Kenichi Tonouchi, Ome (JP); Yoshinori Honda, Nishitama-gun (JP); Takeshi Tajima, Ome (JP); Susumu Kasuga, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/865,073

(22) Filed: Apr. 17, 2013

(65) Prior Publication Data
US 2013/0232569 A1 Sep. 5, 2013

Related U.S. Application Data

(63) Continuation of application No. 13/287,825, filed on Nov. 2, 2011, now abandoned.

(30) Foreign Application Priority Data

Mar. 9, 2011 (JP) .................................. 2011-051464

(51) Int. Cl.
H04L 29/06 (2006.01)
H04W 48/20 (2009.01)
(Continued)

(52) U.S. Cl.
CPC ............ *H04W 48/20* (2013.01); *H04W 12/06* (2013.01); *H04W 84/12* (2013.01)

(58) Field of Classification Search
CPC .............. G06F 21/575; H04B 17/0042; H04B 17/0077; H04W 12/06; H04W 48/20;
(Continued)

(56) References Cited

U.S. PATENT DOCUMENTS 5,369,778 A * 11/1994 San Soucie ........... G06F 9/4443
5,752,032 A * 5/1998 Keller ................... G06F 13/102
710/104
(Continued)

FOREIGN PATENT DOCUMENTS

JP 2004-104552 4/2004
JP 2004-328274 11/2004
(Continued)

OTHER PUBLICATIONS

Roto, V., et al, 'Mobile guides for locating network hotspots', 2005, Nokia Research Center, entire document, http://citeseerx.ist.psu.edu/viewdoc/download?doi=10.1.1.106.4318&rep=rep1&type=pdf.*

(Continued)

*Primary Examiner* — Luu Pham
*Assistant Examiner* — Ronald Baum
(74) *Attorney, Agent, or Firm* — Rutan & Tucker, LLP

(57) ABSTRACT

According to one embodiment, an information processing apparatus comprises a wireless communication device, a display, a logon process module, and a display control module. The logon process module is configured to cause the display to display a logon screen, in a logon process of identifying a user account which uses an operating system. The display control module is configured to cause the display to display, together with the logon screen, a state of an access point detected by the wireless communication device.

10 Claims, 8 Drawing Sheets

(51) Int. Cl.
*H04W 12/06* (2009.01)
*H04W 84/12* (2009.01)

(58) Field of Classification Search
CPC ..... H04W 48/17; H04W 48/16; H04W 84/12;
H04W 8/186; H04W 40/246; H04W
40/248; H04L 41/0806; H04L 41/0853;
H04L 41/0856; H04L 41/12; H04L 67/14
USPC .......................................................... 726/17
See application file for complete search history.

(56) References Cited

U.S. PATENT DOCUMENTS

| | | | |
|---|---|---|---|
| 6,275,977 B1* | 8/2001 | Nagai et al. .................. | 717/104 |
| 6,353,599 B1 | 3/2002 | Bi et al. | |
| 6,625,581 B1* | 9/2003 | Perkowski ........ | G06F 17/30879 705/14.34 |
| 6,651,168 B1* | 11/2003 | Kao et al. ..................... | 713/185 |
| 6,714,969 B1* | 3/2004 | Klein et al. ................... | 709/219 |
| 6,718,185 B1* | 4/2004 | Hisatomi .......... | H04M 1/72522 455/554.1 |
| 6,718,362 B1* | 4/2004 | Beadle .................. | G06F 9/4426 709/201 |
| 6,879,812 B2* | 4/2005 | Agrawal ................. | H04L 43/18 370/252 |
| 7,000,249 B2 | 2/2006 | Lee | |
| 7,164,923 B2* | 1/2007 | Tsunomoto ........... | H04W 48/16 455/422.1 |
| 7,216,365 B2* | 5/2007 | Bhagwat et al. ............... | 726/23 |
| 7,350,067 B2 | 3/2008 | Spottswood | |
| 7,418,591 B2* | 8/2008 | Tachikawa .................... | 713/155 |
| 7,459,898 B1 | 12/2008 | Woodings | |
| 7,613,914 B2 | 11/2009 | Schwendt | |
| 7,668,508 B2* | 2/2010 | Zheng et al. ................. | 455/41.2 |
| 7,673,308 B2* | 3/2010 | McMillan ........... | G06F 9/45537 717/127 |
| 7,734,290 B2* | 6/2010 | Juneja et al. .................. | 455/434 |
| 7,769,837 B2* | 8/2010 | Nogawa et al. ............... | 709/222 |
| 7,782,333 B2* | 8/2010 | Yamaguchi ........... | G06F 3/1415 345/102 |
| 7,885,668 B2 | 2/2011 | Montenegro | |
| 7,900,244 B2 | 3/2011 | Ogata et al. | |
| 7,929,964 B2* | 4/2011 | Arumi ............... | H04W 52/0274 370/329 |
| 8,019,883 B1* | 9/2011 | Margulis ....................... | 709/231 |
| 8,027,268 B2* | 9/2011 | Preston et al. ................ | 370/252 |
| 8,126,145 B1* | 2/2012 | Tewari et al. ................. | 380/255 |
| 8,180,395 B2* | 5/2012 | Moran et al. ................ | 455/556.1 |
| 8,339,990 B1* | 12/2012 | Tzamaloukas ................ | 370/254 |
| 8,351,408 B2* | 1/2013 | Daigle .................... | G06F 21/35 370/338 |
| 8,467,355 B2* | 6/2013 | Herscovici et al. .......... | 370/338 |
| 8,468,165 B2* | 6/2013 | Walker .......................... | 707/769 |
| 8,468,332 B2* | 6/2013 | Jones .................... | G06F 9/4411 713/2 |
| 8,713,635 B2 | 4/2014 | Iga | |
| 9,049,651 B2* | 6/2015 | Meylan ................. | H04W 48/20 |
| 9,066,316 B2* | 6/2015 | Secades ............... | H04W 24/10 |
| 2003/0023761 A1 | 1/2003 | Jeansonne et al. | |
| 2004/0058707 A1 | 3/2004 | Kobayashi | |
| 2004/0102192 A1 | 5/2004 | Serceki | |
| 2004/0185876 A1 | 9/2004 | Groenendaal et al. | |
| 2004/0218602 A1 | 11/2004 | Hrastar | |
| 2005/0176420 A1 | 8/2005 | Graves et al. | |
| 2006/0069760 A1* | 3/2006 | Yeap et al. .................... | 709/221 |
| 2006/0128415 A1 | 6/2006 | Horikoshi et al. | |
| 2006/0193302 A1 | 8/2006 | Morisawa | |
| 2006/0253898 A1 | 11/2006 | Ogata et al. | |
| 2007/0060128 A1 | 3/2007 | Kil | |
| 2008/0052754 A1 | 2/2008 | Iga | |
| 2008/0115208 A1* | 5/2008 | Lee ................ | 726/19 |
| 2008/0123586 A1* | 5/2008 | Manser .................. | H04L 41/12 370/328 |
| 2010/0235616 A1* | 9/2010 | Lagnado et al. ................. | 713/2 |
| 2010/0317403 A1* | 12/2010 | Mizuo ................... | H04W 48/16 455/558 |
| 2011/0252371 A1* | 10/2011 | Nguyen et al. ............... | 715/835 |
| 2011/0286437 A1 | 11/2011 | Austin et al. | |
| 2012/0233688 A1 | 9/2012 | Tonouchi et al. | |

FOREIGN PATENT DOCUMENTS

| | | |
|---|---|---|
| JP | 2005-033285 | 2/2005 |
| JP | 2006-128806 | 5/2006 |
| JP | 2006-166242 | 6/2006 |
| JP | 2006-238270 | 9/2006 |
| JP | 2006260019 | 9/2006 |
| JP | 2007142859 | 6/2007 |
| JP | 2009-033354 | 2/2009 |
| WO | WO 2005/121981 | 12/2005 |

OTHER PUBLICATIONS

Correa, J., et al, 'Room-Level Wi-Fi Location Tracking', Nov. 2008, Carnegie Mellon Silicon Valley https://ai2-s2-pdfs.s3.amazonaws.com/da12/0a32cb0533bd943f0875fea5d44b66855403.pdf.*
Japanese Patent Application No. 2012-016370, Notice of Reasons for Rejection, mailed Apr. 16, 2013, (with English Translation).
Japanese Patent Application No. 2011-051464, Decision of Patent, notice dated Jan. 5, 2012, (with English Translation).
Yoshinobu Kato, "Company making good use of a dangerous wireless LAN cheaply and safely", Nikkei Communication, vol. 407, Japan, Nikkei Business Publications, Inc., Jan. 26, 2004, No. 407, pp. 64-74.
U.S. Appl. No. 13/287,825, Non-Final Office Action, mailed Aug. 9, 2012.
U.S. Appl. No. 13/287,825, Final Office Action, mailed Jan. 25, 2013.
Japanese Patent Application No. 2013-221159, First Office Action, mailed Dec. 2, 2014, (with English Translation).
Screen lock application: "Flyscreen"—Make fullest possible use of screen lock by arranging widgets thereon, andronavi, May 4, 2010, URL: http://andronavi.com/2010/05/19276.
"Android application"—Manage communication environment well with "WiFi Manager", Weekly ASCII PLUS, Mar. 5, 2011, URL: http://weekly.ascii.jp/elem/000/000/036/36317/.
Enhance passcode lock of iPhone—take security measure by using genuine management tool, ZDNet Japan, Jun. 3, 2010 URL: http://japan.zdnet.com/article/20414268/.

* cited by examiner

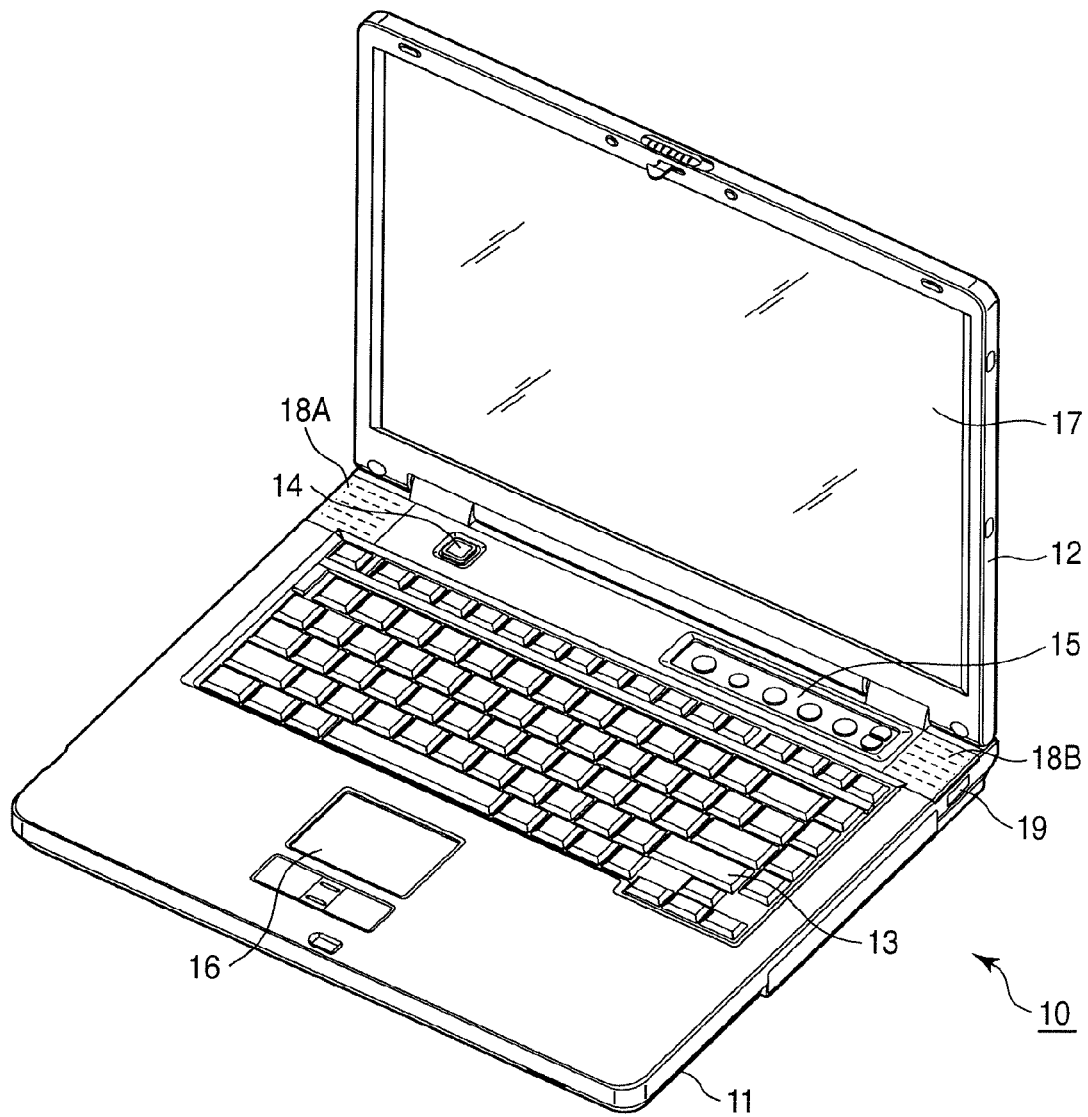
F I G. 1

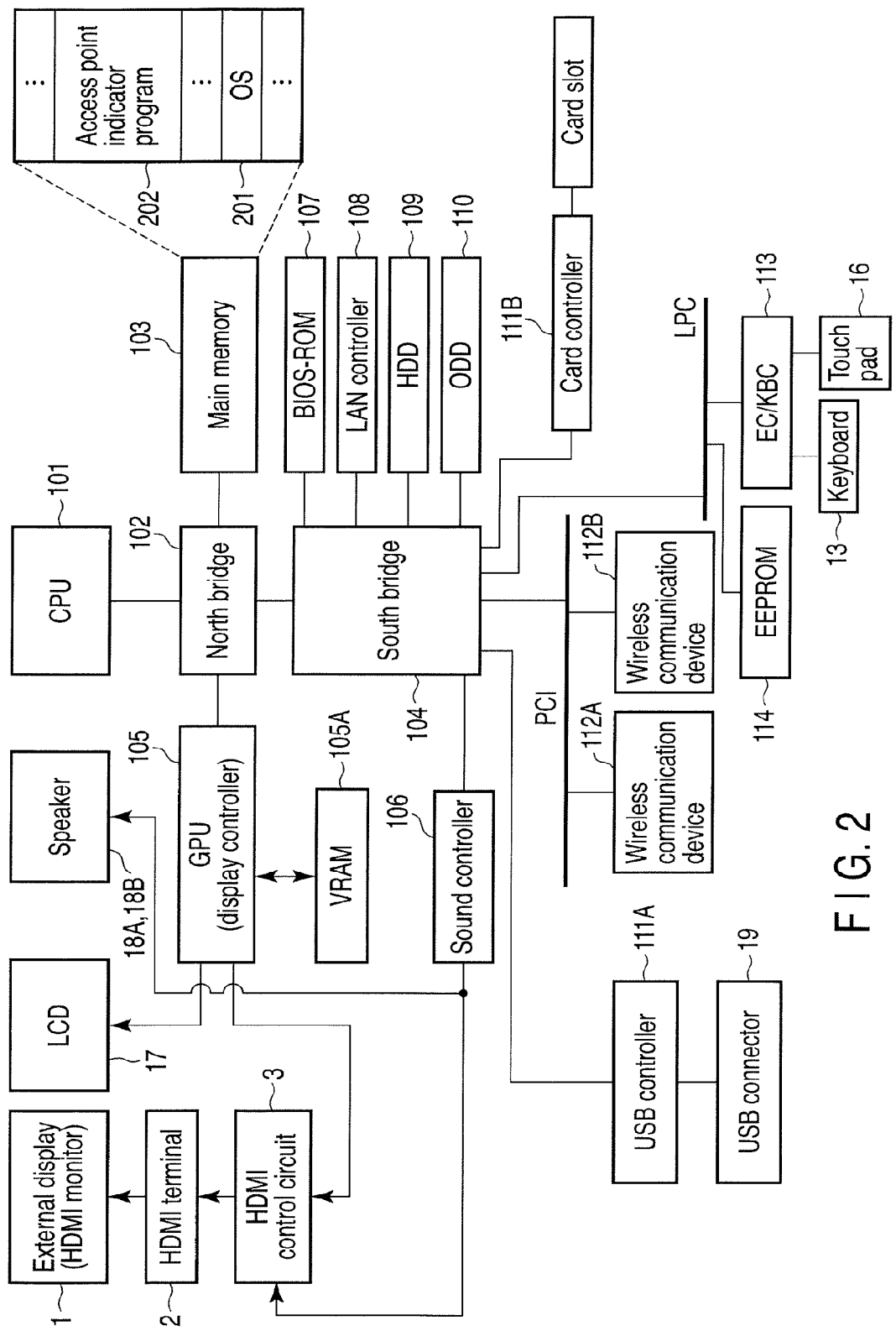
F I G. 2

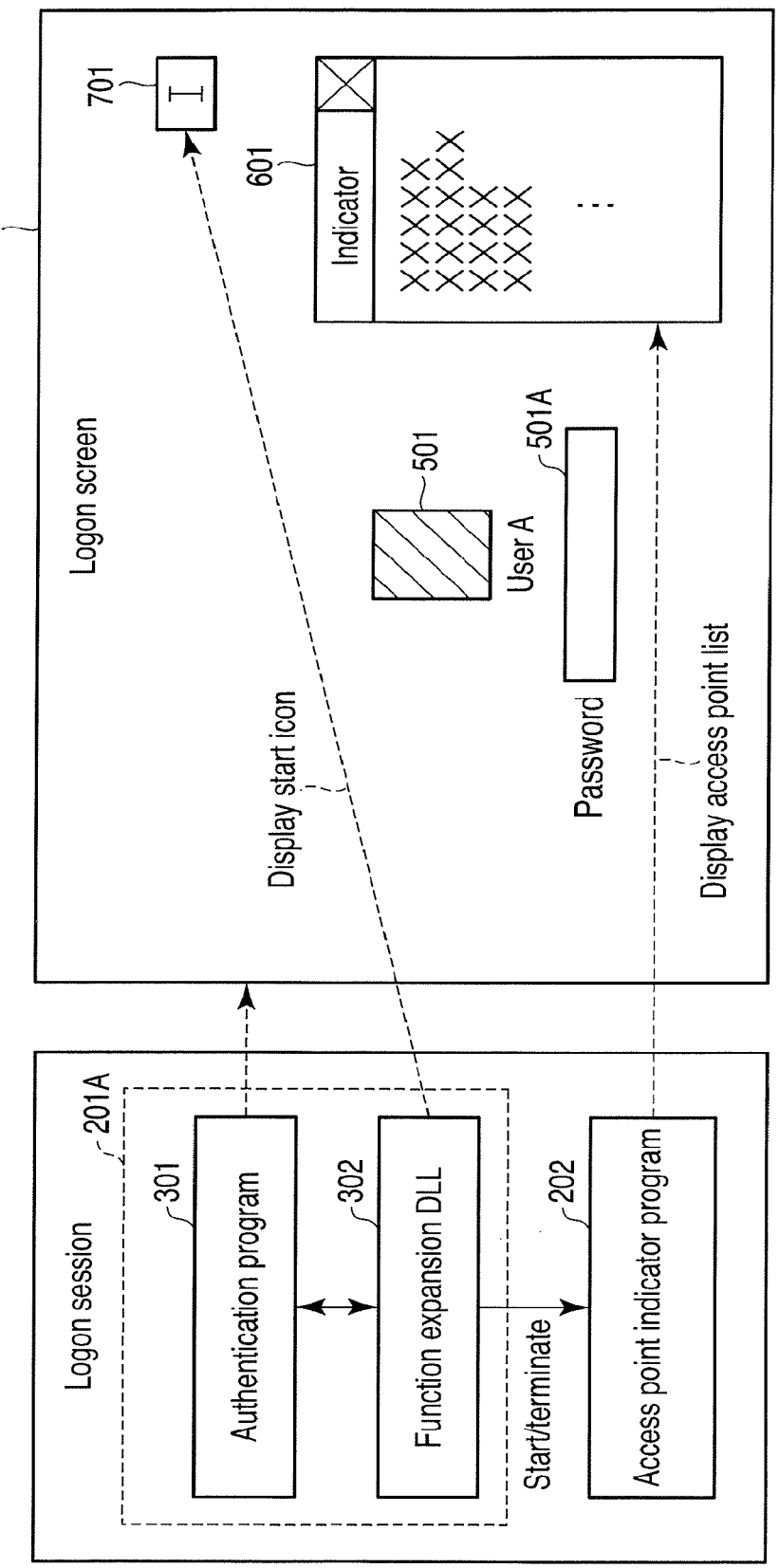
F I G. 4

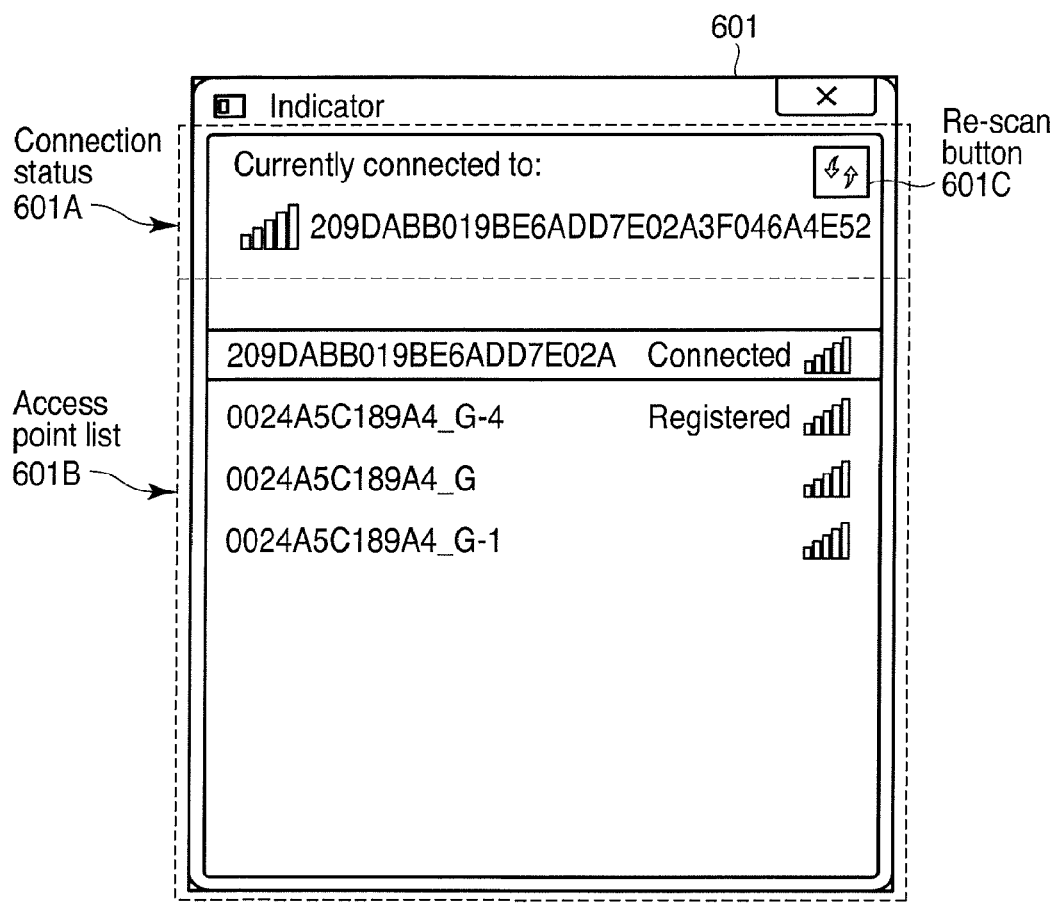
F I G. 6
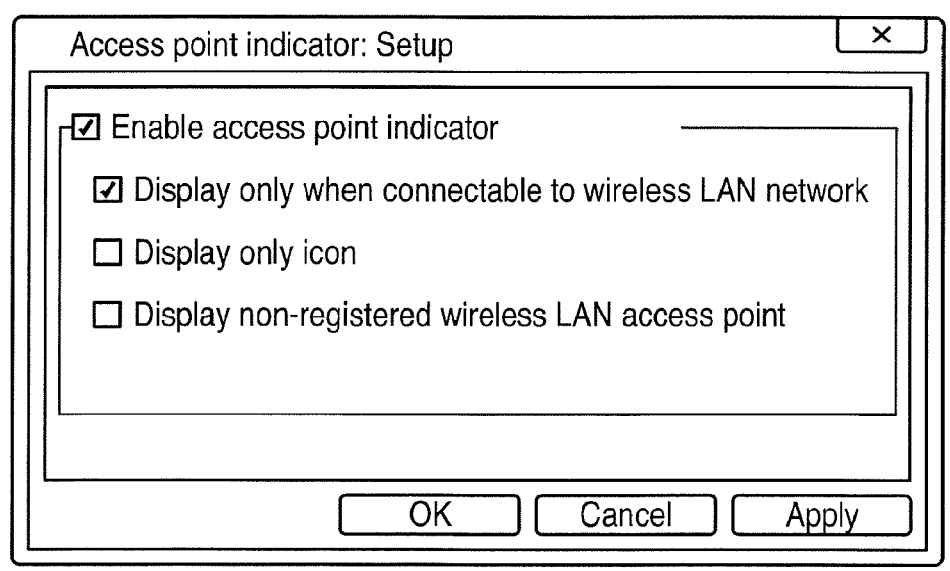
F I G. 7

INFORMATION PROCESSING APPARATUS AND DISPLAY CONTROL METHOD

CROSS-REFERENCE TO RELATED APPLICATIONS

This application is a continuation of U.S. application Ser. No. 13/287,825, now abandoned, which is based upon and claims the benefit of priority from prior Japanese Patent Application No. 2011-051464, filed Mar. 9, 2011, the entire contents of which are incorporated herein by reference.

FIELD

Embodiments described herein relate generally to an information processing apparatus which can execute wireless communication, and a display control method which is applied to this apparatus.

BACKGROUND

In recent years, various information processing apparatuses, such as a personal computer and a personal digital assistant (PDA), have been gaining in popularity. Most of such apparatuses have a wireless communication function. Wireless LAN is known as a representative wireless communication function. Wireless LAN is a wireless communication system which is stipulated by the IEEE 801.11 standard.

Wireless LAN has been widely used in recent years. Access points (base stations) of the wireless LAN are present not only in offices, but also in public wireless LAN service areas on the streets or in airports. Thus, users can perform Web browsing or transmit/receive e-mails at various places.

In the case of ordinary computers, in order to check whether an access point is present near the computer, the user needs to operate software for managing wireless connection after logging on to the computer. The user may try to find, for example, a public wireless LAN area (access point) on the street. In this case, the user first powers on the computer or restores the computer from a sleep state to a working state. Then, the user executes a logon operation (e.g. input of a user name, a password, etc.) and logs on to the computer. Thereafter, the user operates the above-described software. Viewing a list of access points, which is displayed by the software, the user determines whether there is an available access point.

However, if there is no access point near the present position of the computer, the user cannot connect to a wireless network by using the computer, despite the user having logged on to the computer.

In this case, after shutting down the computer or setting the computer in the sleep state, the user needs to carry the computer to another place and to perform the same operations at the place after the movement, that is, an operation of powering on the computer or restoring the computer from the sleep state to the working state, a logon operation and an operation of displaying the access point list.

In the meantime, there has recently been proposed a technique of displaying a detection result of an access point by means of, e.g. an LED, while the computer is in the power-off state.

However, in the state in which the computer is in the power-off state, the CPU and wireless communication device are powered off in usual cases, and all the services of the operating system are halted. Thus, in order to display a detection result of an access point while the computer is in the power-off state, it is necessary to prepare dedicated hardware. As a result, the system configuration may become complex, and an increase in cost of the system may be incurred.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view illustrating the external appearance of an information processing apparatus according to an embodiment;

FIG. 2 is an exemplary block diagram illustrating the system configuration of the information processing apparatus of the embodiment;

FIG. 4 is an exemplary view illustrating a state in which the content of the logon screen, which is displayed by the information processing apparatus of the embodiment, is varied;

FIG. 6 is an exemplary view illustrating an example of the access point indicator dialog, which is displayed by the information processing apparatus of the embodiment;

FIG. 7 is an exemplary view illustrating an example of an access point indicator setup screen which is used in an access point indicator setup process that is executed by the information processing apparatus of the embodiment;

DETAILED DESCRIPTION

Figure 3:
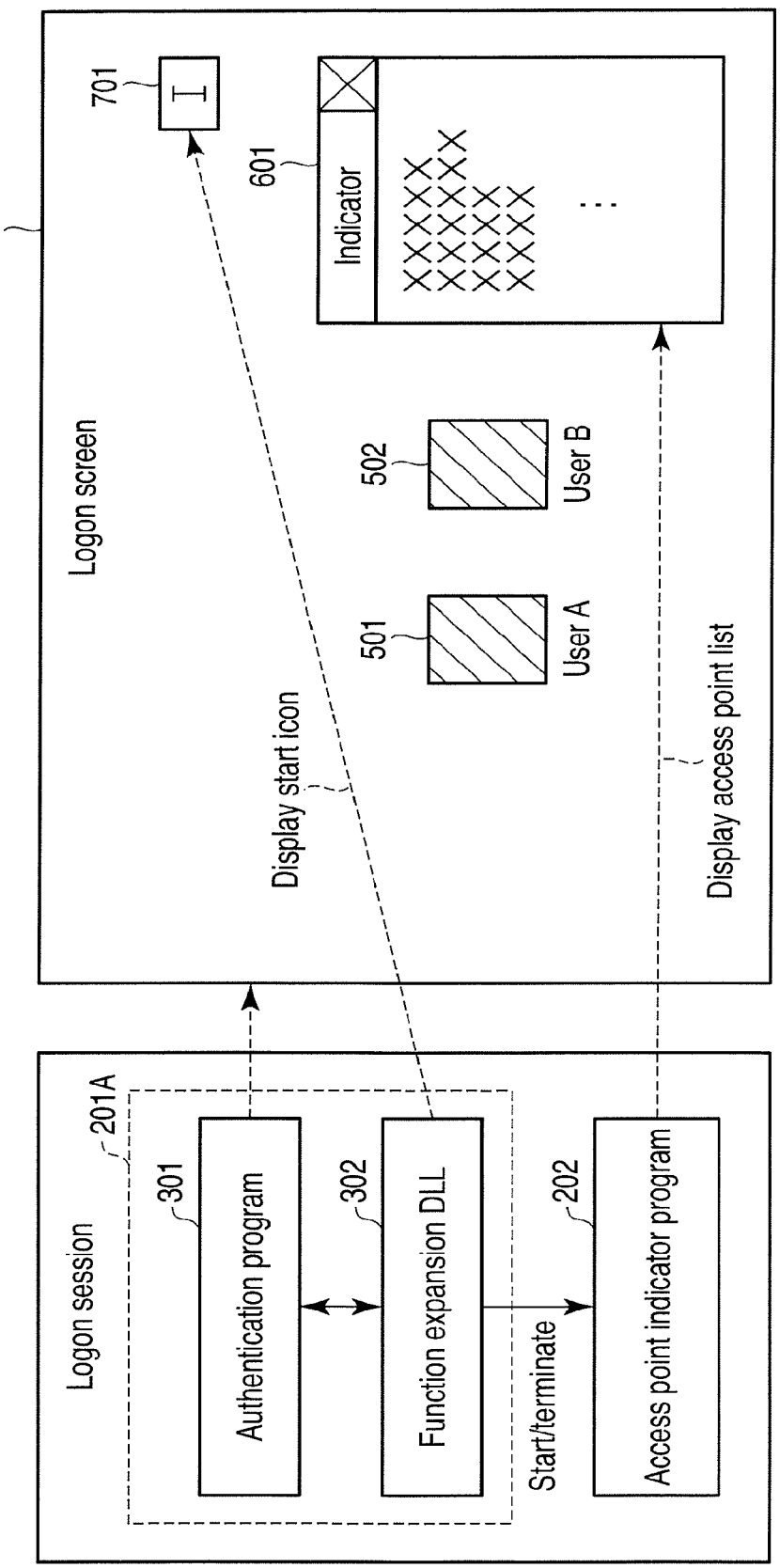
FIG. 3 is an exemplary view illustrating a logon screen and an access point indicator dialog, which are displayed by the information processing apparatus of the embodiment.

Various embodiments will be described hereinafter with reference to the accompanying drawings.

In general, according to one embodiment, an information processing apparatus comprises a wireless communication device, a display, a logon process module, and a display control module. The logon process module is configured to cause the display to display a logon screen, in a logon process of identifying a user account which uses an operating system. The display control module is configured to cause the display to display, together with the logon screen, an access point list indicative of an access point detected by the wireless communication device.

FIG. 1 is a perspective view showing the external appearance of an information processing apparatus according to an embodiment. This information processing apparatus may be realized as a portable device. Examples of the portable device include a notebook-type personal computer (PC), a slate PC, and a PDA. In the description below, the case is assumed in which the information processing apparatus is realized as a notebook-type personal computer 10.

As shown in FIG. 1, the computer 10 comprises a computer main body 11 and a display unit 12. A display device, such as an LCD (liquid crystal display) 17, is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the USB (universal serial bus) standard. In addition, an external display connection terminal (not shown), which supports, e.g. the HDMI (high-definition multimedia interface) standard, is provided on the rear surface of the computer main body 11. The external display connection terminal is used to output a digital video signal to an external display.

FIG. 2 is a view showing the system configuration of the computer 10.

The computer 10, as shown in FIG. 2, comprises a CPU (central processing unit) 101, a north bridge 102, a main memory 103, a south bridge 104, a GPU (graphics processing unit) 105, a VRAM (video random access memory) 105A, a sound controller 106, a BIOS-ROM (basic input/output system-read only memory) 107, a LAN (local area network) controller 108, a hard disk drive (HDD) 109, an optical disc drive (ODD) 110, a USB controller 111A, a card controller 111B, a wireless communication device 112A, a wireless communication device 112B, an embedded controller/keyboard controller (EC/KBC) 113, and an EEPROM 114.

The CPU 101 is a processor for controlling the operations of the respective components in the computer 10. The CPU 101 executes an operating system (OS) 201 and various application/utility programs, which are loaded from the HDD 109 into the main memory 103. The operating system 201 executes a logon process for identifying a user account which uses the operating system 201. In the logon process, the operating system 201 causes the display to display a logon screen. A typical example of the timing of the start of the logon process is a timing immediately after the computer 10 is powered on, or a timing immediately after the computer 10 is restored from the sleep state to the working state. Immediately after the computer 10 is powered on or immediately after the computer 10 is restored from the sleep state to the working state, the operating system 201 causes the LCD 17 to display the logon screen, and identifies the user account which uses the operating system 201, in accordance with a user operation on the logon screen.

The logon screen is used for the logon process (also referred to as "logon session") for causing the operating system 201 to identify the user account (user name) which uses the operating system 201. "Administrator" is one of user accounts. Usually, individual user accounts (individual user names) are associated with profiles indicative of the operational environments corresponding to these individual user accounts.

On the logon screen, icons corresponding to individual user accounts created in advance may be displayed. By clicking a certain icon, the user can select one of the user accounts as a user account which is to use the resources of the computer 10. In accordance with the selected user account (selected user name), the operating system 201 identifies the user account which logs on to the computer 201. Further, the operating system 201 authenticates the user by verifying credential information (e.g. password) which is input by the user ("identification of a person").

If the logon is successfully carried out, the operational environment of the computer 10, that is, the operational environment of the operating system 201, is set to be the operational environment which is indicated by the profile that is associated with the logged-on user account.

When only one user account is created, the logon screen may display only one icon corresponding to this user account.

The application/utility programs include an access point indicator program 202. The access point indicator program 202 is a program for displaying on the display an access point list indicating a list of access points (also referred to as "wireless access points") which are present near the computer 10. In this case, the access point is, for instance, an access point (base station) corresponding to wireless LAN of the IEEE 802.11 standard. The access point list may display individual access points which cover the present position of the computer 10.

Assume now the case in which the wireless communication device 112A is a wireless LAN device which executes wireless communication of the IEEE 802.11 standard. In this case, the access point indicator program 202 may acquire, via the operating system 201, a list of access points from the wireless communication device 112A.

In the logon process, the access point indicator program 202 causes the LCD 17 to display the above-described access point list, together with the logon screen. Accordingly, the user can view the access point list, together with the logon screen, prior to executing a logon operation on the logon screen. Thus, before executing the logon operation, to be more specific, at a timing immediately prior to executing the logon operation on the logon screen, the user can easily confirm whether there is an available access point nearby. The access point list may be displayed separately from the logon screen. However, for the purpose of convenience for the user, use may be made of such a display mode that the access point list is displayed on the logon screen. In this case, in this display mode, the logon screen including the access point list is displayed on the LCD 17. A window displaying the access point list may be opened on the logon screen. The user can view the access point list together with the logon screen, and the user can easily confirm whether there is an available access point nearby.

At the time of starting the logon process, power has already been supplied to all the system components including the CPU 101 and the wireless communication device 112A. Further, the operating system 201 is already executed on the CPU 101. Thus, the structure, in which the access point list is displayed in the logon process, makes it possible to display a list of access points, without using dedicated hardware. In other words, the access point indicator program 202 can easily acquire, via the operating system 201, a list of access points which are detected by the wireless communication device 112A. Besides, the above-described access point list indicating a list of access points detected by the wireless communication device 112A can be displayed on the LCD 17 together with the logon screen, without the use of a dedicated display device such as an LED.

The user, who is to log on, can understand the list of available access points at the present location where the user exists, prior to actually logging on to the computer 10, by viewing the access point list which is displayed together with the logon screen. Hence, the user can change the method of logon by viewing the access point list.

For example, when there is no available access point, the user can cancel the logon operation. Instead, the user may select, based on an available access point, a user account by which the user is to log on, from among a plurality of user accounts corresponding different wireless communication systems which are used for network connection, and may log on to the operating system 201 by using the selected user account.

Assume now the case in which "user account A" and "user account B" are created in advance. In the profile which is associated with the "user account A", the default wireless communication system for network connection is, for instance, wireless LAN. On the other hand, in the profile which is associated with the "user account B", the default wireless communication system for network connection is a wireless communication system other than wireless LAN, for instance, a mobile communication system such as the third-generation wireless communication system, or WiMAX™.

At a place where the user wishes to connect to an external network (Internet), the user powers on the computer 10 or restores the computer 10 from the sleep state to the working state. Then, the user views the access point list that is displayed on the logon screen of the computer 10, and can understand the connectability of wireless LAN at the present location, that is, a nearby access point (wireless LAN access point).

If there is an access point of wireless LAN near the computer 10, or if there is an access point, to which the user previously connected, among access points of wireless LAN which are present near the computer 10, the user may log on to the computer 10 by using the "user account A" which uses the wireless LAN.

On the other hand, if there is no access point of wireless LAN near the computer 10, or if there is no access point, to which the user previously connected, among access points of wireless LAN which are present near the computer 10, the user may log on to the computer 10 by using the "user account B" which uses a wireless communication system other than the wireless LAN.

In this manner, in the present embodiment, the access point list, together with the logon screen, is displayed on the LCD 17 in the logon process. Therefore, the user can determine whether or not to log on, before actually executing the logon operation on the logon screen. In addition, the user can determine by which of the user accounts the logon is to be executed.

The CPU 101 also executes a BIOS that is stored in the BIOS-ROM 107. The BIOS is a program for hardware control.

The north bridge 102 is a bridge device which connects a local bus of the CPU 101 and the south bridge 104. The north bridge 102 comprises a memory controller which access-controls the main memory 103. The north bridge 102 also has a function of communicating with the GPU 105 via, e.g. a PCI EXPRESS serial bus.

The GPU 105 is a display controller which controls the LCD 17 that is used as a display monitor of the computer 10. A display signal, which is generated by the GPU 105, is sent to the LCD 17. In addition, the GPU 105 can send a digital video signal to an external display 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display 1, such as a TV, via a single cable. The HDMI control circuit 3 is an interface for sending a digital video signal to the external display 1, which is called "HDMI monitor", via the HDMI terminal 2.

The south bridge 104 controls devices on a PCI (peripheral component interconnect) bus and devices on an LPC (low pin count) bus. The south bridge 104 comprises an IDE (integrated drive electronics) controller for controlling the HDD 109 and ODD 110. The south bridge 104 also has a function of communicating with the sound controller 106.

The sound controller 106 is a sound source device and outputs audio data, which is a playback target, to the speakers 18A and 18B or the HDMI control circuit 3. The LAN controller 108 is a wired communication device which executes wired communication of, e.g. the IEEE 802.3 standard.

The wireless communication device 112A is a wireless LAN device which executes wireless communication of, e.g. the IEEE 802.11 standard. The wireless communication device 112A has a function of detecting an access point which covers the present position of the computer 10. This detection may be executed by either active scan or passive scan, which is well known.

The wireless communication device 112B is configured to execute wireless communication by a wireless communication system other than wireless LAN, for instance, WiMAX™ or the 3G wireless communication.

Meanwhile, as the wireless LAN device 112A, use may be made of a combo wireless communication device which supports both wireless LAN and WiMAX™. In this case, two wireless communication systems (wireless LAN and WiMAX™) can be supported by the wireless LAN device 112A alone.

The USB controller 111A communicates with an external device which supports, e.g. the USB 2.0 standard (the external device is connected via the USB connector 19). For example, the USB controller 111A is used in order to receive an image data file which is stored in, for example, a digital camera. The card controller 111B executes data write and data read in/from a memory card such as an SD card, which is inserted in a card slot provided in the computer main body 11.

The EC/KBC 113 is a one-chip microcomputer in which an embedded controller for power management and a keyboard controller for controlling the keyboard 13 and touch pad 16 are integrated. The EC/KBC 113 has a function of supplying power to the computer 10 in accordance with the user's operation of the power button 14, thereby powering on the computer 10 or restoring the computer 10 from the sleep state to the working state.

If the power button 14 is operated in the power-off state of the computer 10, the computer 10 is powered on, and a boot sequence for booting the operating system (OS) 201 is started. In the boot sequence, various services are started by the operating system 201. Thereafter, the above-described logon screen is displayed by the operating system 201.

On the other hand, if the power button 14 is operated in the sleep state of the computer 10, the computer 10 is restored from the sleep state to the working state. Using a system context which is stored in the main memory 103 or HDD 109, the states of the respective system components are restored to the state immediately before the computer 10 transitioned to the sleep state. Thereby, the operating system (OS) 201 starts (resumes) the operation, and displays the above-described logon screen.

Next, referring to FIG. 3, the logon screen and access point list, which are displayed by the computer 10, are described.

The above-described logon process is executed by a logon process program 201A in the operating system 201. The logon process program 201A comprises an authentication program 301 for executing identification of the user account and authentication of the user. The authentication program 301 causes the LCD 17 to display a logon screen 401 in the logon process for identifying the user account which uses the operating system 201.

In the present embodiment, the logon process program 201A further comprises a function expansion DLL (dynamic link library) 302 as a program for expanding the function of the logon process program 201A. The function expansion DLL 302 is configured to start the access point indicator program 202 in the logon process, thereby to display the access point list together with the logon screen. The access point indicator program 202 may be started, for example, in response to the start of the logon process. For example, the function expansion DLL 302 may start and terminate the access point indicator program 202 in response to the start and termination of the logon process. Further, the function expansion DLL 302 can display an indicator start icon 701 on the logon screen 401. When the indicator start icon 701 is operated by the user, the function expansion DLL 302 may start the access point indicator program 202.

At the time of starting the logon process, the authentication program 301 displays the logon screen 401 on the LCD 17. The logon screen 401 may display icons corresponding to individual user accounts which are created in advance. FIG. 3 shows an example in which the logon screen 401 displays two icons, namely, an icon 501 corresponding to a user account "user A" and an icon 502 corresponding to a user account "user B". By clicking the icon (501 or 502) corresponding to a desired user account, the user can select the user account that is to be used. When the icon (e.g. icon 501) corresponding to the desired user account has been clicked, the authentication program 301 may change the logon screen 401, as shown in FIG. 4, and may display on the logon screen 401 an input field 501A for prompting the user to input credential information (password) corresponding to the selected user account.

As has been described above, for example, when the logon process is started, the function expansion DLL 302 starts the access point indicator program 202. The started access point indicator program 202 acquires, via an API of the operating system 201, a list of access points which are detected by the wireless LAN device (wireless communication device 112A). Based on the acquired list of access points, the access point indicator program 202 creates an access point list. Then, the access point indicator program 202 displays the created access point list on a movable window (indicator window) 601 which is displayed (opened) on the logon screen 401.

The indicator window 601 is also called "indicator dialog". The indicator window 601 displays a list of access points which have been detected by the wireless LAN device (wireless communication device 112A), that is, a list of wireless LAN access points which cover the present position of the computer 10.

By a drag operation by means of a pointing device, the user can also move the indicator window 601 to an arbitrary position on the logon screen 401. It is possible, therefore, to prevent such a situation from occurring that display items on the logon screen are hidden by the indicator window 601. Thus, even if the indicator window 601 is displayed on the logon screen 401, the possibility of the occurrence of a problem with the logon operation itself can be decreased.

The access point indicator program 202 stores, as internal setup information, position information indicative of the destination position to which the indicator window 601 has been moved on the logon screen 401. In the next logon process, the access point indicator program 202 displays the indicator window 601 at a position on the logon screen 401, which is indicated by the stored position information. Accordingly, the user can display the indicator window 601 at an easy-to-view position at all times, without performing such an operation as moving the indicator window 601 to a desired position on the logon screen 401 each time the logon process is executed.

Since the indicator window 601 has a close button (a button indicated by mark "x"), the user can close the indicator window 601, that is, can terminate the access point indicator program 202, where necessary.

As has been described above, the indicator start icon 701 may be displayed on the logon screen 401. Instead of automatically starting the access point indicator program 202 at the time of starting the logon process, the function expansion DLL 302 may start the access point indicator program 202 when the indicator start icon 701 has been clicked by the user. Thereby, the user can display the indicator window 601 on the logon screen 401, where necessary, at an arbitrary timing during the logon process.

When the logon process is terminated (e.g. when the logon has successfully be executed, or when the logon has been canceled), the function expansion DLL 302 terminates the access point indicator program 202. Thereby, the indicator window 601 on the logon screen 401 is closed, and the process of the access point indicator program 202 is terminated.

Figure 5:
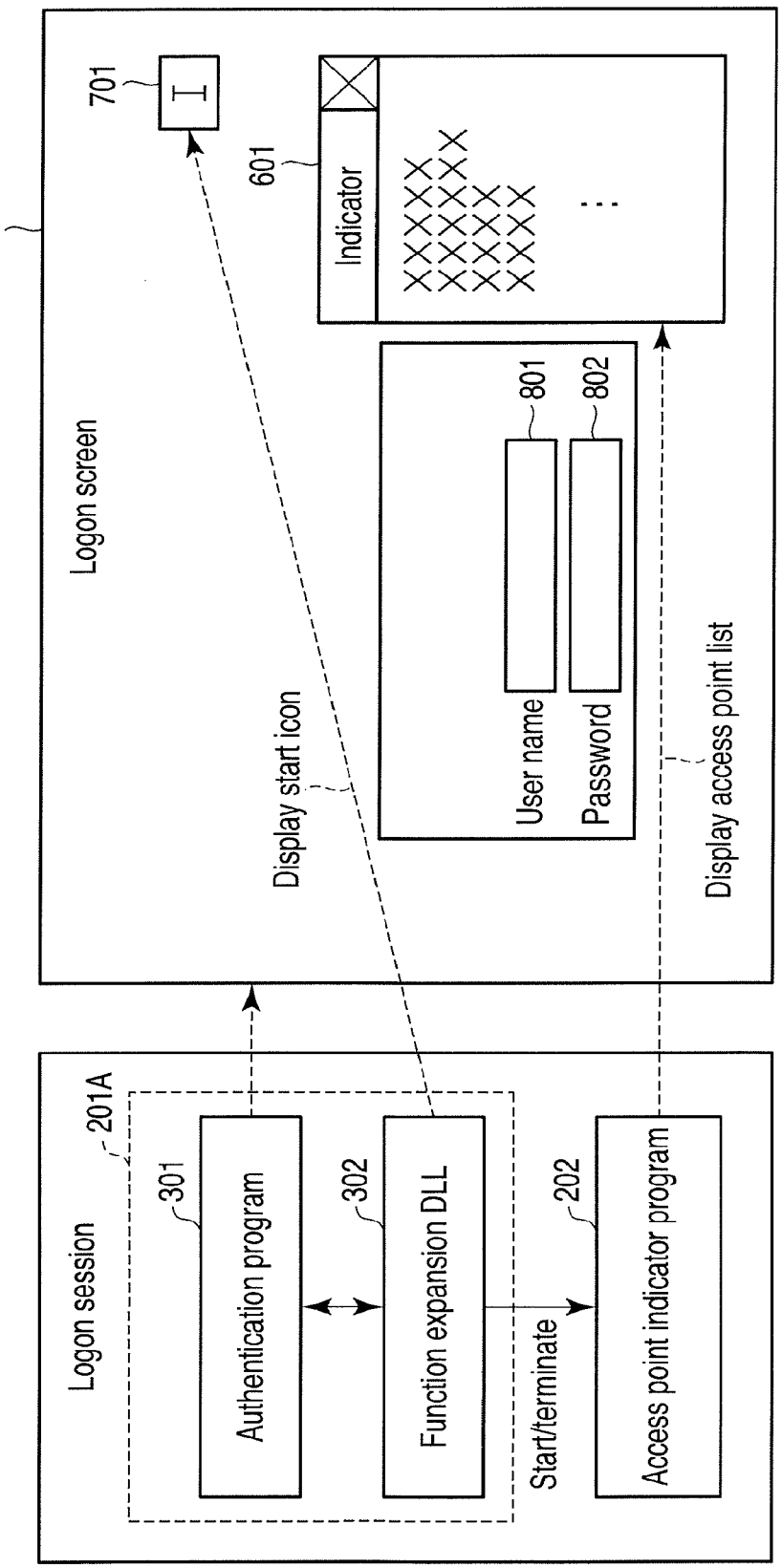
FIG. 5 is an exemplary view illustrating another example of the logon screen which is displayed by the information processing apparatus of the embodiment.

FIG. 5 shows another example of the logon screen 401. The logon screen 401 of FIG. 5 displays, in place of the icons corresponding to individual user accounts, a field 801 for inputting a user account name (user name), and a field 802 for inputting credential information (password). The user inputs a user account name, by which the user is to log on to the operating system 201, and credential information (password) corresponding to the user account name in the fields 801 and 802 on the logon screen 401, thus being able to log on to the operating system 201.

Next, referring to FIG. 6, a description is given of the content which is displayed on the indicator window 601.

The indicator window 601 displays a connection status display area 601A, an access point list display area 601B, and a re-scan button 601C. The connection status display area 601A displays the current connection state of the wireless LAN device (wireless communication device 112A).

For example, when the wireless LAN device is currently connected to an access point, the current connection state is "currently connected". When the current connection state is "currently connected", the connection status display area 601A displays an identifier (e.g. SSID) of an access point to which the wireless LAN device is being connected, following a character string "Currently connected to". In addition, the connection status display area 601A displays an icon indicative of the intensity of a wireless signal which is received from this access point.

When an access point (registered access point), to which the wireless LAN device was previously connected, is included in the access points which have been detected by the wireless LAN device, the wireless LAN device may automatically be connected to this registered access point under the control of the operating system 201.

The access point list display area 601B displays a list of access points which have been detected by the wireless LAN device. All access points, which are present near the wireless LAN device, may be displayed, or only a registered access point, which is present near the wireless LAN device, may be displayed. In the access point list display area 601B, a character string "Connected", which indicates "currently connected", is displayed on a lateral side of the identifier (SSID) of the access point which is currently connected. A character string "Registered", which indicates "already registered", is displayed on a lateral side of the identifier (SSID) of a registered access point.

In addition, the access point list display area 601B displays icons indicative of the intensities of wireless signals which are received from the individual access points.

When the re-scan button 601C has been clicked by the user, the access point indicator program 202 receives once again the information indicative of the list of access points from the wireless LAN device via the operating system 201, and updates the content that is displayed on the indicator window 601, based on the received information.

Next, referring to FIG. 7, a description is given of the structure for controlling the operation of the access point indicator program 202.

FIG. 7 illustrates an example of a setup screen for setting up the operational environment of the access point indicator program 202. When a setup program, which is stored in the HDD 109 in advance, has been started by the user, this setup screen is displayed on the LCD 17 by this setup program. The setup screen includes the following setup items.

(1) "Enable access point indicator": When the check box of "Enable access point indicator" has been marked by the user, the access point indicator program 202 is enabled. When the check mark in the check box of "Enable access point indicator" has been cleared, the access point indicator program 202 is not executed.

(2) "Display only when connectable to wireless LAN network": This setup item can be used only when the check box of "Enable access point indicator" has been marked. If the check box of "Display only when connectable to wireless LAN network" has been marked by the user, the access point indicator program 202 determines whether a registered access point is present in the detected access points. The access point indicator program 202 displays the indicator window 601 of FIG. 6 only when a registered access point is present, and does not display the indicator window 601 of FIG. 6 when a registered access point is not present.

(3) "Display only icon": This setup item can be used only when the check box of "Enable access point indicator" has been marked. The setup item of "Display only icon" is used in order to execute setup as to whether the indicator window 601 is automatically displayed when the logon process is started. If the check box of "Display only icon" has been marked by the user, only the indicator icon 701 is displayed on the logon screen 401 when the logon process is started, and the indicator window 601 is not displayed on the logon screen 401.

(4) "Display non-registered wireless LAN access point": This setup item can be used only when the check box of "Enable access point indicator" has been marked. If the check box of "Display non-registered wireless LAN access point" has been marked by the user, the access point indicator program 202 also displays an access point, to which the computer 10 was not previously connected, on the access point list display area 601B of the indicator window 601 of FIG. 6.

The values of the setup items, which have been set by the setup screen of FIG. 7, are stored in a setup file as setup values. The setup file may be stored in the HDD 109.

Figure 8:
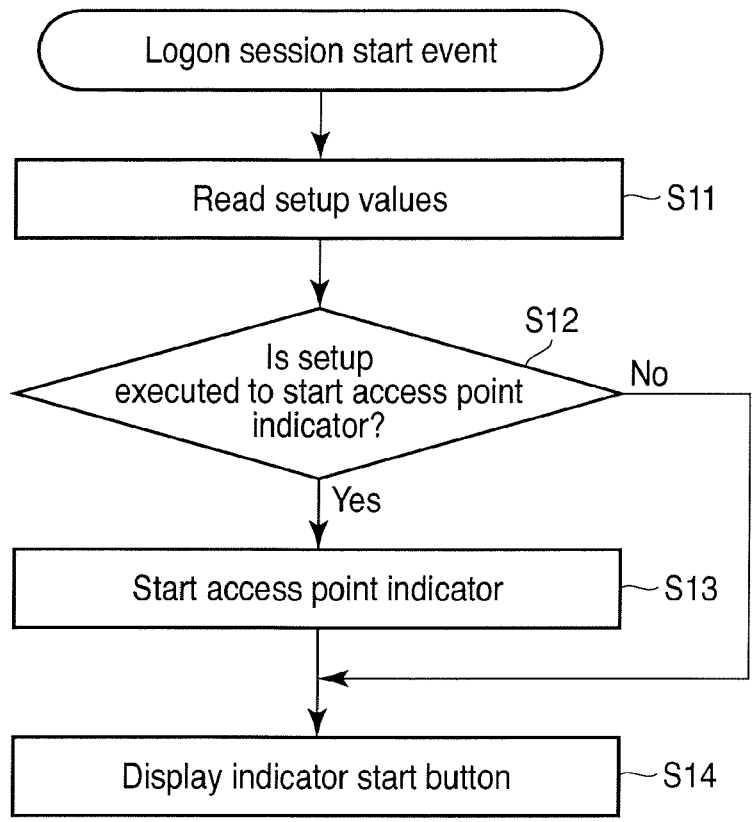
FIG. 8 is an exemplary flow chart illustrating a procedure which is executed at a time of starting a logon process by a function expansion DLL which is used in the information processing apparatus of the embodiment.
Figure 9:
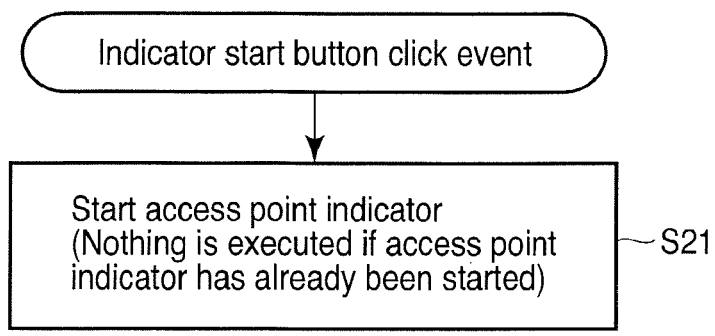
FIG. 9 is an exemplary flow chart illustrating a procedure which is executed at a time of an indicator start button click by the function expansion DLL which is used in the information processing apparatus of the embodiment.
Figure 10:
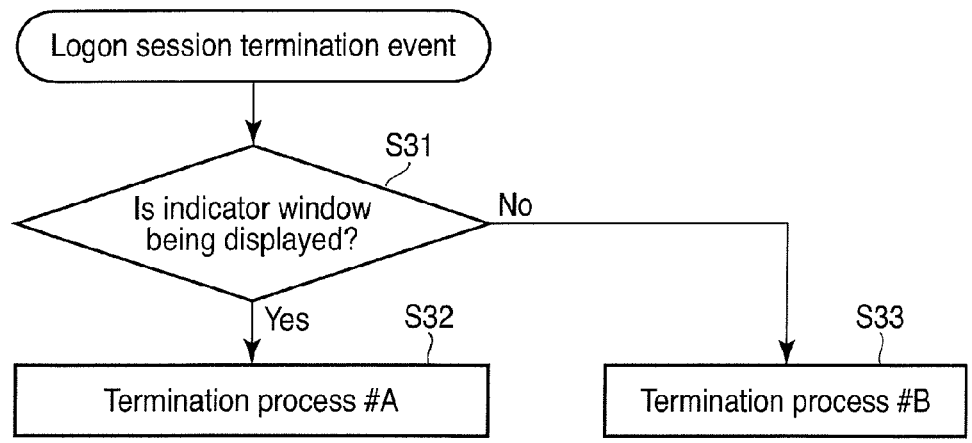
FIG. 10 is an exemplary flow chart illustrating a procedure which is executed at a time of terminating the logon process by the function expansion DLL which is used in the information processing apparatus of the embodiment.

Next, referring to flow charts of FIG. 8, FIG. 9 and FIG. 10, a description is given of the procedures of processes which are executed by the function expansion DLL 302.

When an event of starting the logon process (logon session start event) has occurred, the function expansion DLL 302 executes the process illustrated in FIG. 8. Examples of the event of starting the logon process include the generation of a logon request to the operating system 201, the generation of a user switch request, and the generation of a lock release request.

At the time of starting the logon process, the function expansion DLL 302 reads, from the setup file, setup values corresponding to the respective setup items (step S11). Then, the function expansion DLL 302 determines whether such setup is executed as to start the access point indicator program 202 at the time of the logon process, that is, whether the setup item of "Enable access point indicator" indicates "Enabled" (step S12).

If the setup item of "Enable access point indicator" indicates "Enabled" (YES in step S12), the function expansion DLL 302 starts the access point indicator program 202, thereby to display the indicator window 601 together with the logon screen 401 (step S13). Then, the function expansion DLL 302 displays the indicator start icon (also referred to as "indicator start button") 701 on the logon screen 401 (step S14).

If the setup item of "Enable access point indicator" does not indicate "Enabled" (NO in step S12), the function expansion DLL 302 skips step S13, and displays the indicator start icon 701 on the logon screen 401 (step S14).

When the indicator start icon 701 has been clicked, the function expansion DLL 302 executes the process illustrated in FIG. 9. Specifically, when the indicator start icon 701 has been clicked, the function expansion DLL 302 starts the access point indicator program 202, thereby to display the indicator window 601 together with the logon screen 401 (step S21).

When a logon process termination event (logon session termination event) has occurred, the function expansion DLL 302 executes the process illustrated in FIG. 10. Examples of the logon process termination event include the success of logon, the success of user switching, the cancel of logon, the cancel of user switching, the success of lock release, and the cancel of lock release.

At the time of terminating the logon process, the function expansion DLL 302 determines whether the indicator window 601 is being displayed or not (step S31). If the indicator window 601 is being displayed (YES in step S31), the function expansion DLL 302 executes a termination process #A (step S32). In the termination process #A, the function expansion DLL 302 executes a process of closing the indicator window 601, and a process of terminating the access point indicator program 202.

If the indicator window 601 is not being displayed (NO in step S31), the function expansion DLL 302 executes a termination process #B (step S33). In the termination process #B, the function expansion DLL 302 executes a process of terminating the access point indicator program 202.

Figure 11:
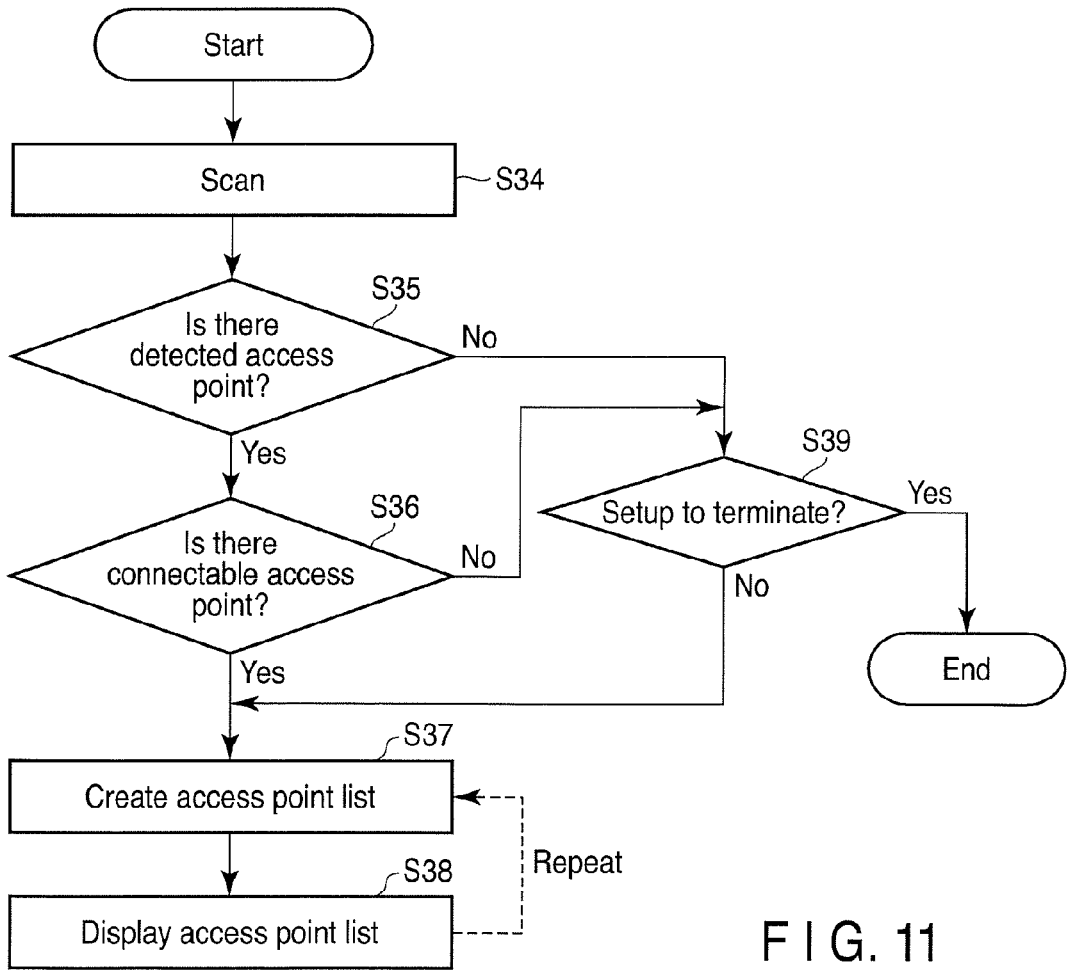
FIG. 11 is an exemplary flow chart illustrating a procedure which is executed by an access point indicator program which is used in the information processing apparatus of the embodiment.

Next, referring to FIG. 11, a description is given of the process procedure which is executed by the access point indicator program 202.

When the access point indicator program 202 has been started, the access point indicator program 202 acquires an access point detection result (scan result) from the wireless communication device 112A via the API of the operating system 201 (step S34). In step 34, the access point indicator program 202 may send a wireless network detection request to the API of the operating system 201. Responding to the wireless network detection request, the operating system 201 may send a scan request to the wireless communication device 112A. The wireless communication device 112A detects access points covering the present position of the computer 10 by executing the scan process. The detection result of access points is returned to the access point indicator program 202 via the API of the operating system 201.

Based on the access point detection result which has been acquired via the API of the operating system 201, the access point indicator program 202 determines whether one or more access points have been detected (step S35). If one or more access points have been detected (YES in step S35), the access point indicator program 202 determines whether a connectable access point is included in the list of the detected access point(s) (step S36). The connectable access point is, for instance, a registered access point. The reason is that information, such as an encryption key, for connecting to the registered access point is already present in the operating system 201. In step S36, the access point indicator program 202 determines whether a registered access point, which is managed by the operating system 201, is present in the list of access point(s) detected by the wireless communication device 112A.

If the registered access point is present (YES in step S36), the access point indicator program 202 creates the access point list 601 so that the access point list 601 indicates the registered access point (step S37), and displays the access point list 601 on the logon screen 401 (step S38).

Depending on the setup values, the access point list 601 may display not only the registered access point but also non-registered access point(s). In this case, the following process is executed.

If no access point is detected (NO in step S35) or if an available access point (registered access point) is not present in the detected access point(s) (NO in step S36), the access point indicator program 202 determines whether or not to terminate the process (step S39). For example, if the setup item of "Display only when connectable to wireless LAN network" is enabled, the access point indicator program 202 terminates the process.

On the other hand, if the setup item of "Display only when connectable to wireless LAN network" is not enabled, the access point indicator program 202 creates the access point list 601 so as to display a list of all detected access points (step S37), and displays the access point list 601 on the logon screen 401 (step S38).

As has been described above, according to the present embodiment, the access point list is displayed together with the logon screen. Therefore, without using dedicated hardware, it is possible to timely present the access point list to the user, and to enhance the convenience for the user with respect to the use of the wireless network.

In the case of a computer having two physically different display devices, it is possible to display the logon screen on one of the two display devices, while displaying the access point list on the other display device. In this case, too, since the indicator window 601 can be displayed together with the logon screen 401, the convenience for the user with respect to the use of the wireless network can be improved.

All the procedures of the access point list display process of the embodiment can be executed by software. Thus, the same advantageous effects as with the present embodiment can easily be obtained simply by installing a computer program, which executes the procedures of the access point list display process, into an ordinary computer through a computer-readable storage medium which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a wireless communication device;
a display; and
a processor configured to:
(i) execute, by an operating system, a first process of causing the display to display a logon screen for logging on the operating system, wherein the logon screen displays a user identification (ID) of a user, an input field for inputting a password corresponding to the user ID, and a first icon for starting a first function of displaying on the logon screen a state regarding wireless communication of the wireless communication device, and wherein the first icon is displayed on the logon screen together with the user ID and the input field;
(ii) responsive to the first process being executed, determine whether one or more registered access points, which are managed by the operating system and which were previously connected to the wireless communication device, are present in one or more access points detected by the wireless communication device;
(iii) responsive to determining that one or more registered access points are present in one or more access points detected by the wireless communication device, and responsive to a second process executed that performs a logon operation for inputting a password to the input field, execute a logon process to authenticate the user by verifying an input password which is input to the input field on the logon screen;

(iv) responsive to determining that either (a) one or more registered access points are not present in the one or more access points detected by the wireless communication device or (b) no access points are detected by the wireless communication device, block the logon process authentication verification of the user; and (v) responsive to a user input for operating the first icon being detected before the logon operation is performed on the logon screen, execute a process of causing the display to display on the logon screen a current state regarding the wireless communication, wherein the current state regarding the wireless communication is displayed on the logon screen together with the user ID and the input field, wherein the current state regarding the wireless communication comprises (1) a list of one or more access points detected by the wireless communication device, (2) one or more icons indicative of intensities of wireless signals received from the one or more access points, and (3) information for identifying access point being currently connected to the wireless communication device.

2. The information processing apparatus of claim 1, wherein the processor is further configured to display the current state regarding the wireless communication on a movable window displayed on the logon screen, to store position information indicative of a destination position to which the window has been moved on the logon screen, and to display, when the logon screen is displayed at a next time, the window at a position on the logon screen, which is indicated by the stored position information.

3. The information processing apparatus of claim 1, wherein the wireless communication device is a wireless LAN device.

4. The information processing apparatus of claim 1, wherein the processor is further configured to execute a setup process for enabling or disabling the first function based on an operation by a user, and to execute, when the first function is in an enabled state, a process of causing the display to display on the logon screen the first icon.

5. A display control method executed by a processor of an information processing apparatus comprising the processor, a display and a wireless communication device, the processor configured to execute an operating system, the method comprising:

executing, by the processor, a first process of causing the display to display a logon screen for logging on the operating system, wherein the logon screen displays a user identification (ID) of a user, an input field for inputting a password corresponding to the user ID, and a first icon for starting a first function of displaying on the logon screen a state regarding wireless communication of the wireless communication device, and wherein the first icon is displayed on the logon screen together with the user ID and the input field;

responsive to the first process being executed, determining whether one or more registered access points, which are managed by the operating system and which were previously connected to the wireless communication device, are present in one or more access points detected by the wireless communication device;

responsive to determining that one or more registered access points are present in one or more access points detected by the wireless communication device, and responsive to a second process executed that performs a logon operation for inputting a password to the input field, executing, by the processor, a logon process to authenticate the user by verifying an input password which is input to the input field on the logon screen;

responsive to determining that either (a) one or more registered access points are not present in the one or more access points detected by the wireless communication device or (b) no access points are detected by the wireless communication device, blocking the logon process authentication verification of the user; and responsive to a user input for operating the first icon being detected before the logon operation is performed on the logon screen, executing, by the processor, a process of causing the display to display on the logon screen a current state regarding the wireless communication, wherein the current state regarding the wireless communication is displayed on the logon screen together with the user ID and the input field, wherein the current state regarding the wireless communication comprises (1) a list of one or more access points detected by the wireless communication device, (2) one or more icons indicative of intensities of wireless signals received from the one or more access points, and (3) information for identifying an access point being currently connected to the wireless communication device.

6. The display control method of claim 5, wherein the wireless communication device is a wireless LAN device.

7. The display control method of claim 5, further comprising executing a setup process for enabling or disabling the first function based on an operation by a user, wherein the first icon is displayed on the logon screen when the first function is in an enabled state.

8. A computer readable, non-transitory storage medium having stored thereon a program which is executable by a computer, the computer comprising a wireless communication device, and a processor configured to execute an operating system, the program controlling a computer to execute functions of:

executing, by the processor, a first process of causing a display in the computer to display a logon screen for logging on the operating system, wherein the logon screen displays a user identification (ID) of a user, an input field for inputting a password corresponding to the user ID, and a first icon for starting a first function of displaying on the logon screen a state regarding wireless communication of the wireless communication device, and wherein the first icon is displayed on the logon screen together with the user ID and the input field;

responsive to the first process being executed, determining whether one or more registered access points, which are managed by the operating system and which were previously connected to the wireless communication device, are present in one or more access points detected by the wireless communication device;

responsive to determining that one or more registered access points are present in one or more access points detected by the wireless communication device, and responsive to a second process executed that performs a logon operation for inputting a password to the input field, executing, by the processor, a logon process to authenticate the user by verifying an input password which is input to the input field on the logon screen;

responsive to determining that either (a) one or more registered access points are not resent in the one or more access points detected by the wireless communication device or (b) no access points are detected by the wireless communication device, blocking the logon process authentication verification of the user; and responsive to a user input for operating the first icon being detected before the logon operation is performed on the logon screen, executing, by the processor, a process of causing the display to display on the logon screen a current state regarding the wireless communication, wherein the current state regarding the wireless communication is displayed on the logon screen together with the user ID and the input field, wherein the current state regarding the wireless communication comprises (1) a list of one or more access points detected by the wireless communication device, (2) one or more icons indicative of intensities of wireless signals received from the one or more access points, and (3) information for identifying access point being currently connected to the wireless communication device.

9. The storage medium of claim 8, wherein the wireless communication device is a wireless LAN device.

10. The storage medium of claim 8, wherein the program further controls the computer to execute a function of executing a setup process for enabling or disabling the first function based on an operation by a user, and wherein the first icon is displayed on the logon screen when the first function is in an enabled state.

* * * * *